United States Patent [19]
Conroy

[11] Patent Number: 5,823,551
[45] Date of Patent: Oct. 20, 1998

[54] SURFBOARD OR SAILBOARD CARRIER

[76] Inventor: William A. Conroy, 2000 S. Hoefner Ave., Commerce, Calif. 90040

[21] Appl. No.: 835,585

[22] Filed: Apr. 9, 1997

[51] Int. Cl.$^6$ .................................................. B62B 1/00
[52] U.S. Cl. ........................................ 280/47.131; 280/63
[58] Field of Search .................... 280/47.24, 47.131, 280/79.7, 63, 47.17, 47.26

[56] References Cited

U.S. PATENT DOCUMENTS

| | | | |
|---|---|---|---|
| 4,666,184 | 5/1987 | Garvey, Jr. ......................... | 280/47.131 |
| 4,852,895 | 8/1989 | Moffitt ............................... | 280/47.131 |

FOREIGN PATENT DOCUMENTS

| | | | |
|---|---|---|---|
| 3739728 | 6/1989 | Germany ......................... | 280/47.131 |

*Primary Examiner*—Richard M. Camby
*Attorney, Agent, or Firm*—Wagner, Middlebrook & Kimbell

[57] ABSTRACT

A lightweight carrier for aiding in transporting an elongated load such as one or more surfboards or sailboards either uncovered on in carrying bags is formed of a simple U-shaped frame of polyvinyl chloride (PVC) pipe having attached wheels. The carrier which is normally fastened to one end of the load, includes a padded cross member which carries much of the load and padded upright supports or arms which are sufficiently flexible that they can deform or bend outwardly or inwardly. A strap is used to pull the tops of the arms together around the load. A surfer can then carry the opposite end of the load which will trail behind him on the carrier.

6 Claims, 2 Drawing Sheets

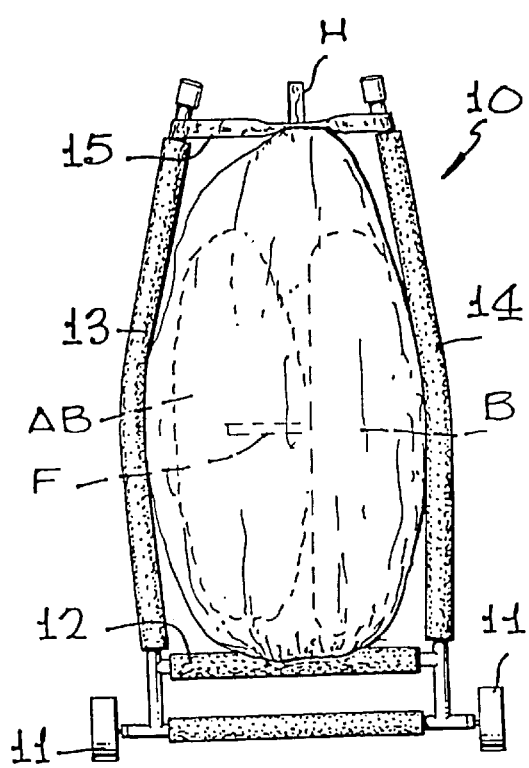
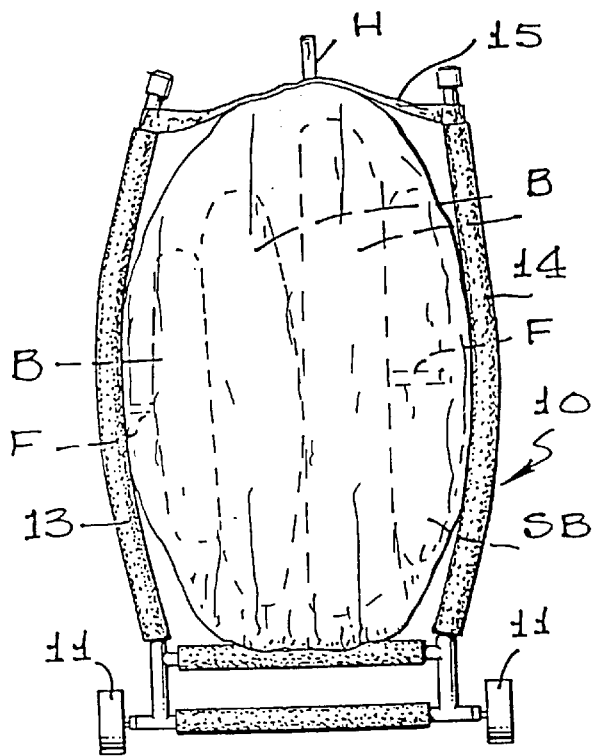
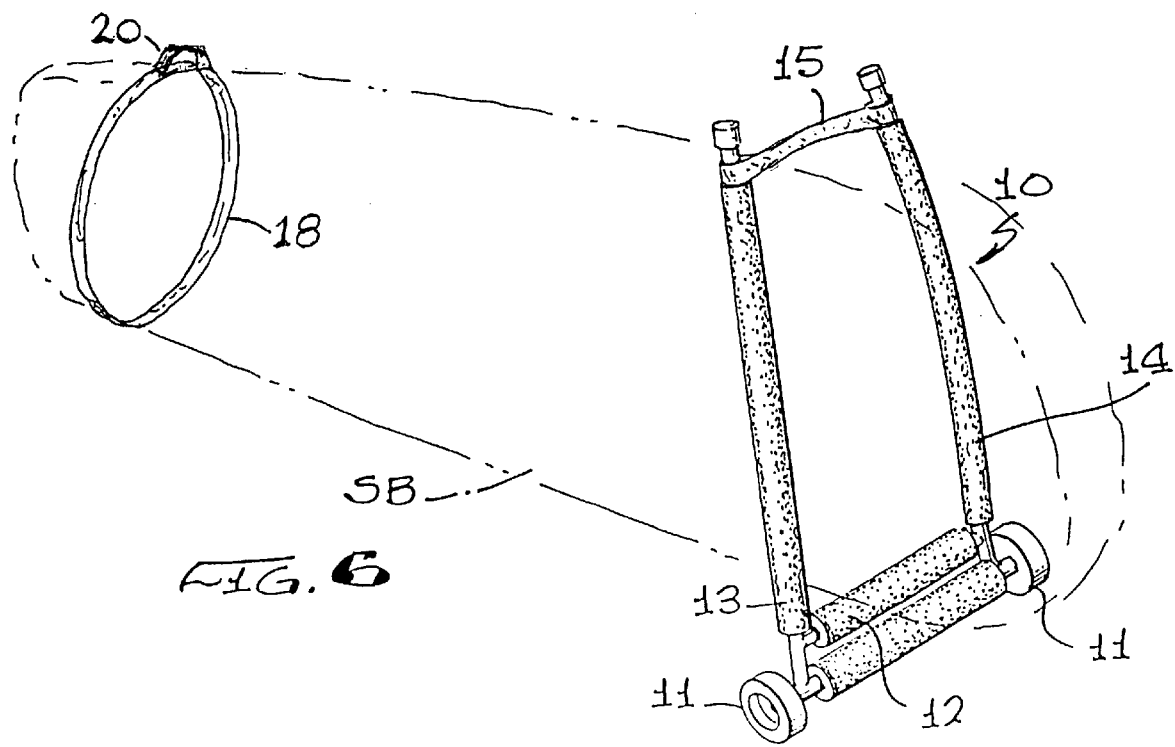

SURFBOARD OR SAILBOARD CARRIER

BRIEF SUMMARY OF THE INVENTION

The present invention relates to carriers and more particularly to a manually pulled carrier for surfboards or sailboards.

Because of their size and particularly their length, surfboards and sailboards often present difficulties in transportation, particularly where space is limited as in crowded areas, through doorways, etc. Surfboards are usually light in weight and are often carried by an individual centered under his or her arm; however, they are of such length that a small turn of one carrying the surfboard may result in an end of the board swinging two or three feet with resulting danger of colliding with walls, doorways or people.

It is therefore an object of the present invention to provide a surfboard carrier which is light and easily portable when empty or when carrying one or more surfboards and which substantially reduces the chances of the collisions described above.

It is another object of the present invention to provide a surfboard carrier which meets the above objective and in which one or more surfboards are supported securely with essentially no danger of their falling or slipping out of the carrier.

The above objects are met by applicant's carrier which includes a very lightweight frame carried on a single axle with two wheels, and wherein one or more surfboards or sailboards are supported on a single padded horizontal bar and held in position by a pair of padded but flexible upstanding arms secured to the ends of the horizontal bar which arms can bow outwardly or inwardly as required to secure the load. A strap fastened between the upstanding arms may be adjusted to vary the distance between the tops of the arms to thereby pull the upstanding arms around the load.

BRIEF DESCRIPTION OF THE DRAWINGS

This invention may be more clearly understood with the following detailed description and by reference to the drawings in which:

FIG. 2 is a rear elevational view of the carrier of FIG. 1 carrying a single surfboard or sailboard within a carrying bag employing this invention;

FIG. 3 is a rear elevational view of the carrier of FIGS. 1 and 2 holding a bag with as many as three surfboards contained therein;

FIG. 6 is a perspective view of the surfboard or sailboard carrier of FIGS. 1–5.

DETAILED DESCRIPTION OF THE INVENTION

Figure 1:
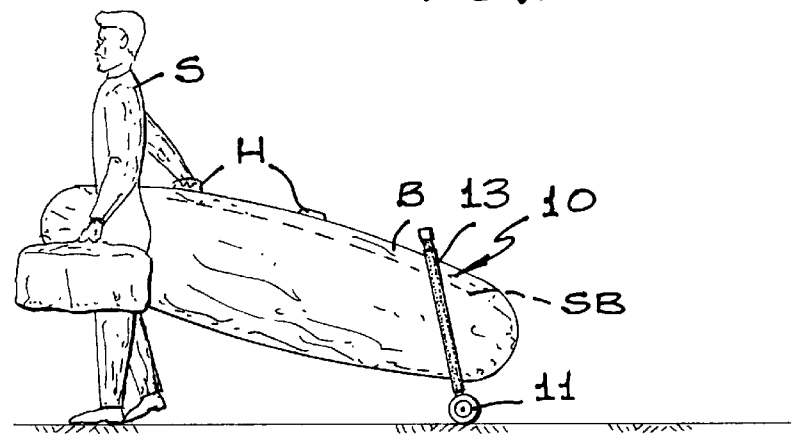
FIG. 1 is a side elevational view of an individual transporting a number of surfboards or sailboards in a bag using the carrier of this invention.

This invention is illustrated in FIG. 1 in its most important function for a traveler who carries one or more surfboards with him. Surfboards which range in length from six to twelve feet in length, although light in weight, are extremely cumbersome when carried, particularly when they are transported by commercial air carriers. The most difficult portion of the trip for the surfer is the travel between ground transportation and the airport counter where the surfboard is to be checked in as large luggage. To protect surfboards and nearby persons, surfboard bags have been designed which enclose one or more surfboards protecting their surfaces and fins and which may be carried by one person or two using sewn in handles at the top of the bag. Still there is danger to nearby persons when the bag is carried by hand.

As seen in FIG. 1, the surfer S who may be carrying his other luggage merely grasps the handle H and pulls the surfboard bag along with the rear end of the bag B supported by carrier 10 which rolls on its two wheels 11 with the bag B carried securely resting on a padded cross member 12 (see FIG. 2) and nestled between padded upstanding arms 13 and 14 of which only arm 13 is shown in FIG. 1. The bag B is secured between arms 13 and 14 by strap 15, best seen in FIGS. 4 and 5.

Referring now to FIG. 2, the carrier 10 includes a pair of wheels 11 secured to a frame which includes an axle 16 carrying wheels 11 and which is wrapped with a cylindrical layer of plastic foam padding. Spaced from and parallel to axle 16 is cross member 12 which is similarly padded. Secured at the ends of cross member 12 are upstanding arms 13 and 14 which are padded similarly to axle 16 and cross member 12. A strap 15 is shown secured to the top of the upstanding arm 14. Arms 13 and 14 have caps 13A and 14A. Strap 15 is secured tightly around the top of arm 14 between cap 14A and the padding on arm 14 so that it does not readily slide down or pull off the top of arm 14. A bag B having a handle H carries a surfboard or sailboard SB having a fin F and also an accessory bag AB.

FIG. 3 shows the same carrier 10 with a bag B carrying two or more surfboards SB. It will be observed that the upright arms 13 and 14 are bowed outwardly a greater distance than shown in FIG. 2 to accommodate the greater width of the load. By pulling the strap 14 up between the ends of arms 13 and 14, the bag B can be held securely between arms 13,14 over a substantial variation in the cross section of the load. If desired, cross member 12 and axle 16 can be made longer to accommodate larger bags carrying more surfboards or sailboards.

Figures 4, 5:
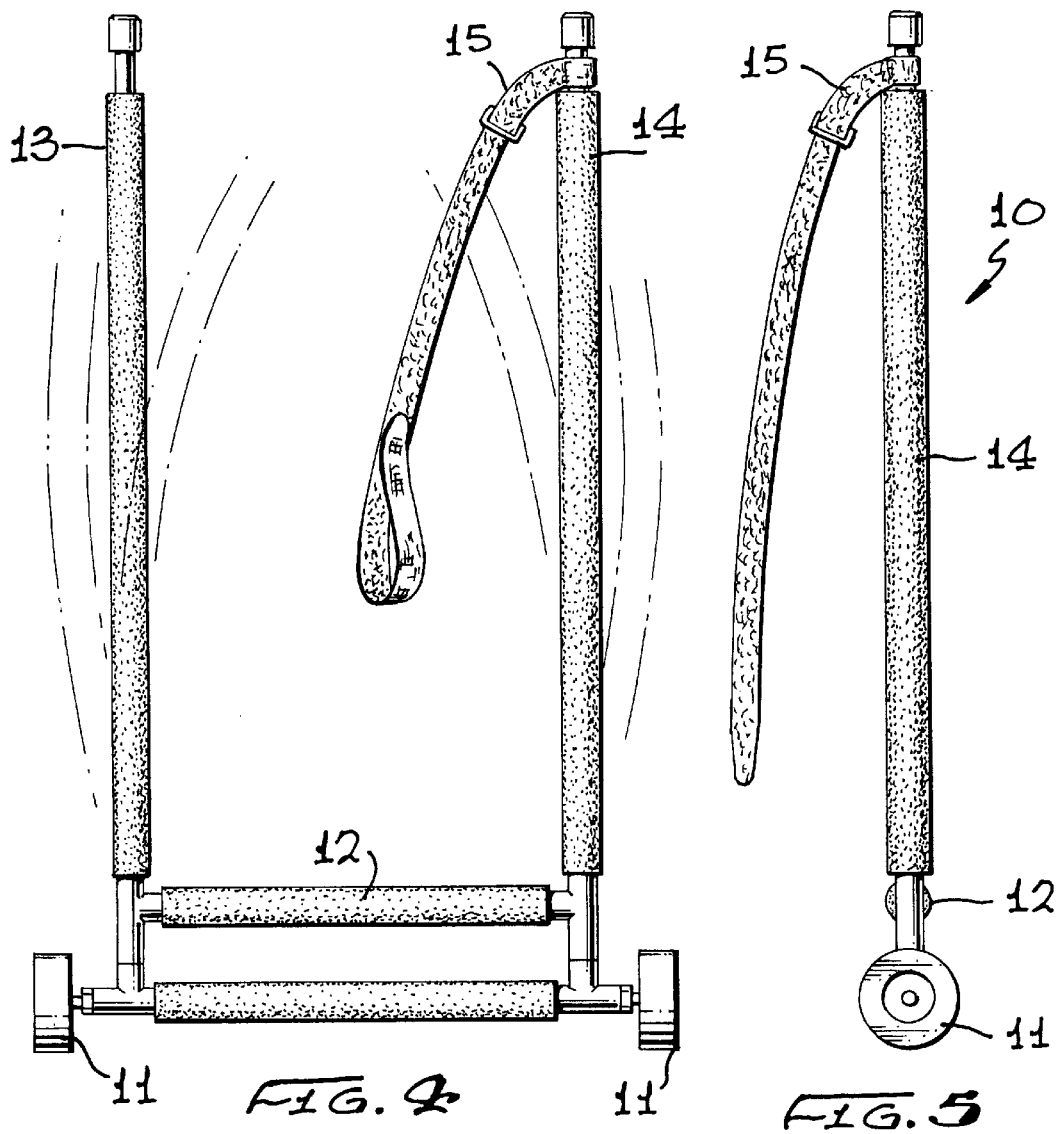
FIG. 4 is a rear elevational view of the carrier of FIGS. 1–3 showing the flexible nature of the upstanding arms of the carrier.
FIG. 5 is a side elevational view of the carrier of FIGS. 1–4 showing its strap used for adjusting the degree of closure of the arms of the carrier.

FIG. 4 shows the carrier 10 without a load. The dash-dot lines indicate the flexibility of arms 13 and 14 to accommodate to loads of greater or smaller cross section. The strap 15 is shown secured to arm 14 and unattached to arm 13.

FIG. 5 is a side elevational view of carriage 10 showing the strap 15 used for adjusting the spacing between the tops of upstanding arms 13,14.

FIG. 6 is a perspective view of the carrier 10 shown in association with an alternate strap arrangement wherein there may be attached to a surfboard or sailboard SB, a separate accessory strap 18 with a carrying handle 20 providing an end loop which is secured around the forward end of the surfboard or sailboard SB. This arrangement is advantageous when the surfer wishes to transport a surfboard without a carry bag or with a carry bag having no similarly located handle. In such instances, the forward end of the carry bag or the surfboard or sailboard SB can be carried under the arm of surfer S with the trailing end supported by carriage 10; however, this is somewhat less satisfactory than an arrangement such as shown in FIG. 6 or where a bag B with a handle H is available.

The carrier 10 is preferably made of very lightweight material such as polyvinyl chloride (PVC) pipe covered where indicated with flexible plastic foam.

The above described embodiments of the present invention are merely descriptive of its principles and are not to be considered limiting. The scope of the present invention instead shall be determined from the scope of the following claims including their equivalents.

I claim:

1. A carrier for a lightweight elongated load such as surfboards and the like comprising a generally U-shaped frame of lightweight material including a horizontal cross piece for supporting said load, a pair of upstanding arms secured to said horizontal cross piece which are capable of being deflected a limited amount, a pair of wheels attached to said frame, padding on said horizontal cross piece and on said upstanding arms, and a strap secured to one of said arms for pulling the tops of said upstanding arms toward each other to secure said load between said arms.

2. A carrier as claimed in claim 1 wherein said frame includes a second cross piece spaced from and parallel to said first cross piece and said wheels are secured to the ends of said second cross piece.

3. A carrier as claimed in claim 1 wherein said pair of upstanding arms are flexible such that they can bow outwardly or inwardly as required to secure said load.

4. A carrier as claimed in claim 1 wherein said frame is made of polyvinyl chloride pipe material.

5. A carrier as claimed in claim 1 wherein said padding comprises flexible plastic foam material.

6. A carrier for a lightweight elongated load such as surfboards and the like comprising a generally U-shaped frame of polyvinyl chloride pipe material including a horizontal cross piece for supporting said load, a pair of upstanding arms secured to said horizontal cross piece which are sufficiently flexible that they can bow inwardly or outwardly as required to secure said load, plastic foam padding material on said horizontal cross piece and said upstanding arms, a second horizontal cross piece spaced from and parallel to said first cross piece, wheels secured to said second cross piece, and a strap secured to one of said upstanding arms for pulling the tops of said upstanding arms toward each other to secure said load between said arms.

* * * * *